June 25, 1963     A. C. SANFORD     3,094,748
CORRUGATED TOOTHED CONNECTOR PLATE
Filed Nov. 10, 1960     2 Sheets-Sheet 1

INVENTOR.
ARTHUR CAROL SANFORD
BY
ATTORNEYS

June 25, 1963 A. C. SANFORD 3,094,748
CORRUGATED TOOTHED CONNECTOR PLATE
Filed Nov. 10. 1960 2 Sheets-Sheet 2

*INVENTOR.*
ARTHUR CAROL SANFORD
BY *Ely, Frye & Hamilton*

ATTORNEYS

United States Patent Office 3,094,748
Patented June 25, 1963

3,094,748
CORRUGATED TOOTHED CONNECTOR PLATE
Arthur Carol Sanford, Fort Lauderdale, Fla., assignor to Sanford Industries, Inc., a corporation of Florida
Filed Nov. 10, 1960, Ser. No. 68,530
10 Claims. (Cl. 20—92)

The invention relates generally to connector plates for connecting wood members together at a joint, and more particularly to connector plates having a plurality of teeth punched out on one side of the plate and pressed into the wood of the two wood members to be connected. This application is a continuation-in-part of my copending application Serial No. 843,496, filed September 30, 1959.

Toothed connector plates are adapted for connecting wood truss members at the joints thereof, as well as for connecting the joints of other wood structures, and the teeth distribute the stresses over the entire area of the plate. The strength of the plate is measured by the aggregate shear strength of the teeth. However, the stresses tend to cause the plate to buckle and pull out the teeth before the aggregate shear strength is reached.

In my copending application Serial No. 843,496 I disclosed and claimed a plate having substantially triangular punched-out teeth each with one edge inclined to the plate and an undercut portion on the other edge to substantially increase the holding power when embedded into the wood.

I have now discovered that the holding power of the teeth can be still further increased by using a corrugated plate, or similarly embossed plate, and punching rows of teeth out of the corrugations in such manner that when the plate is substantially flattened by pressing the teeth into the wood, the teeth are tilted laterally to compress the wood fibers so that their resiliency resists pulling out the teeth.

It is an object of the present invention to provide an improved toothed plate having adequate plate strength and increased holding power.

Another object is to provide an improved toothed plate in which the teeth are more easily embedded into the wood.

A further object is to provide an improved toothed plate having corrugations related to the teeth so as to cause lateral tilting of said teeth when the plate is flattened.

These and other objects are accomplished by the improved toothed connector plate comprising the present invention, a preferred embodiment of which is shown by way of example in the accompanying drawings and described in detail herein. Various modifications and changes in details of construction may be made within the scope of the appended claims.

Figure 1:
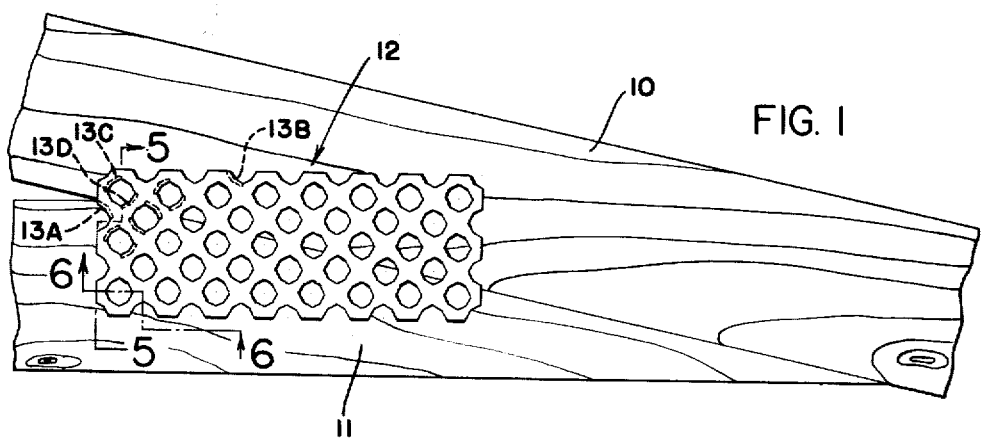
FIG. 1 is an elevational view of one of the improved plates applied to the heel joint of a wood truss.

Referring to FIG. 1, the heel joint of a wood truss includes the upper chord 10 connected to the lower chord 11 by an elongated plate indicated generally at 12 having its teeth embedded into the chords. Preferably, a similar plate is applied to the opposite side of the joint. As shown, the plate has teeth formed along and intersecting the edges of the plate to increase the holding power of the plate along its edges.

Figure 2:
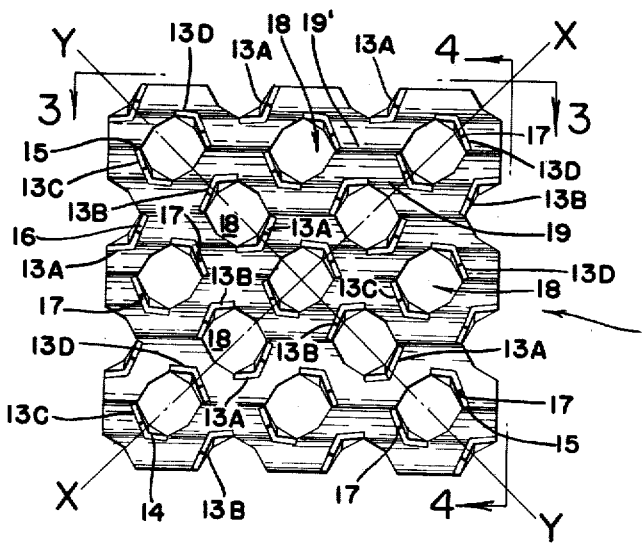
FIG. 2 is an enlarged bottom plan view of a section of the improved plate before being flattened.
Figure 3:
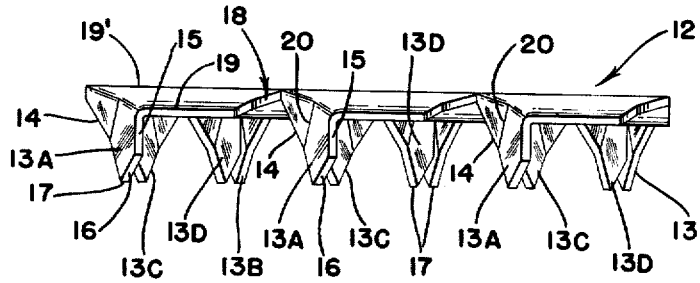
FIG. 3 is a further enlarged side elevation of said plate on line 3—3 of FIG. 2.
Figures 4, 5:
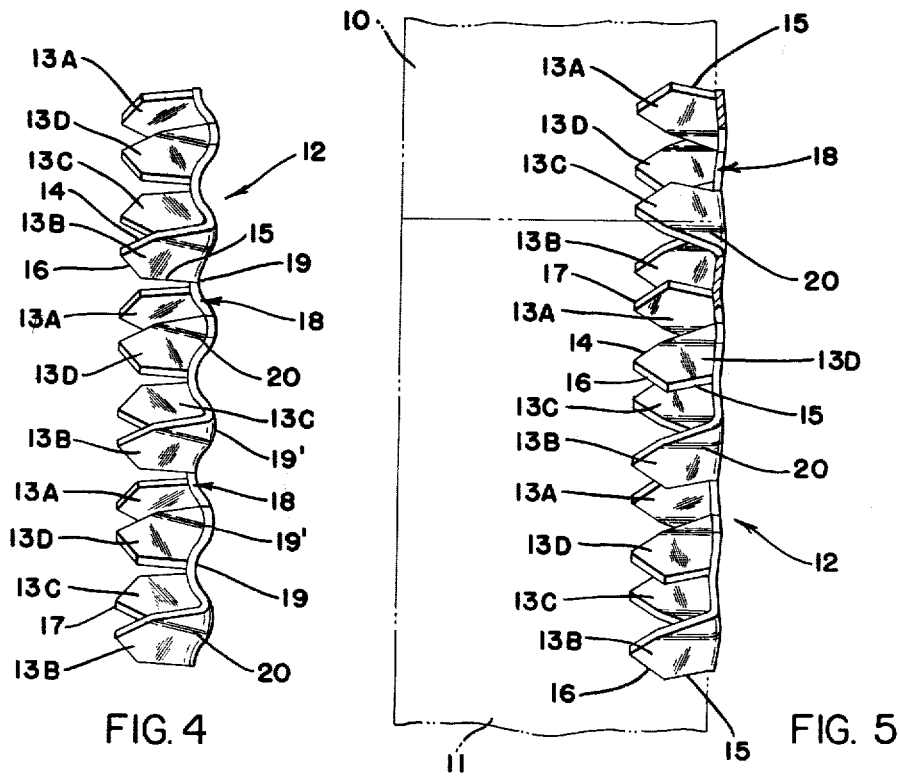
FIG. 4 is an end view of said plate on line 4—4 of FIG. 2.
FIG. 5 is a view similar to FIG. 4, showing how the teeth are tilted laterally as the plate is flattened, taken on line 5—5 of FIG. 1.
Figure 6:
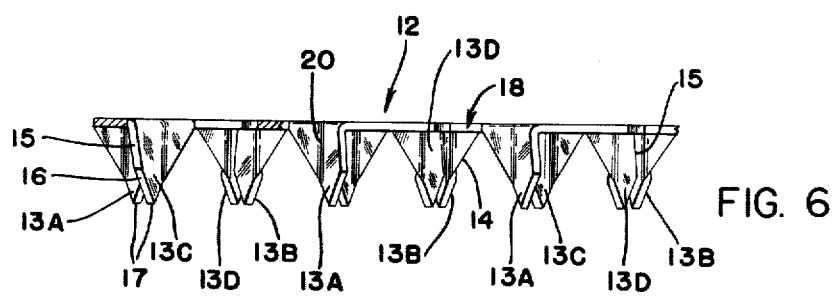
FIG. 6 is a view similar to FIG. 3, showing how the teeth are tilted laterally as the plate is flattened, taken on line 6—6 of FIG. 1.

Referring to FIGS. 2 and 3, the teeth 13A, 13B, 13C and 13D are punched out in pairs of substantially rectangular, actually octagonal or polygonal openings. Each tooth is substantially a right angled triangle with one slightly convex edge 14 inclined to the plate at substantially 45° and the other edge having an inner substantially vertical portion 15 and an outer slightly inclined portion 16 meeting edge 14 in a point 17. Each tooth is dished or crimped along a line substantially perpendicular to the plate and intersecting the inclined edge 14. As shown in FIGS. 3 and 4, the openings 18 are formed in rows by punching out teeth at intervals along longitudinal corrugations 19 in the plate and angularly, diagonally, or obliquely to the direction of said corrugations. In alternate rows the pairs of teeth are preferably at 90° to the teeth in the other rows; and the openings 18 in alternate rows are staggered relative to each other.

Each pair of teeth 13A, 13B and 13C, 13D extends outwardly from opposite sides of an opening 18, alternate pairs of teeth along inclined lines X—X and Y—Y preferably being turned 90° to each other. The edges 14 of each pair of teeth are inclined in opposite directions with the points of each pair 13A, 13B slightly laterally offset with respect to the lines Y—Y, and the points of each pair 13C, 13D slightly laterally offset with respect to the lines X—X. The teeth 13A, 13B are bodily offset laterally of the lines X—X, and the teeth 13C, 13D, are bodily offset laterally of the lines Y—Y.

The corrugations 19 are shown as rounded grooves connected to rounded ridges 19', but they may be formed by intersecting inclined planes in which case the grooves 19 would be angular troughs or valleys and the ridges 19' would be angular ridges.

By making the openings 18 octagonal, the crimping of the teeth is facilitated because the crimping takes place along lines 20 at two opposite points of the octagonal opening from which a pair of teeth is punched. By locating the openings in and along the corrugations, and punching the teeth of each pair angularly from opposite slopes of the corrugation, the angular disposition of the teeth with respect to the plate is changed when the corrugations are substantially flattened, as occurs when the teeth are pressed into the wood of a joint, as indicated in FIG. 5 by means of a press or the like.

While the teeth of each pair are punched from aligned openings 18 located in the grooves 19 of the corrugation, similar results would be obtained if the teeth of each pair were punched from aligned openings located in the ridges 19' of the corrugations. Moreover, all of the teeth may be reversed, or turned 90° in relation to the plate, to obtain a different relationship to the grain of the wood members, if desired.

Figure 7:
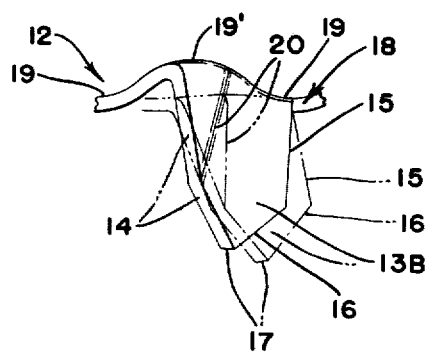
FIG. 7 is a still further enlarged fragmentary view of one tooth similar to FIG. 4, showing in phantom the tilted position of the tooth when the plate is substantially flattened.

In other words, flattening the corrugations causes the teeth to tilt laterally substantially edgewise, and because the teeth of each pair are punched from opposite slopes of the same corrugation, the teeth of each pair tilt laterally edgewise in opposite directions toward their vertical portions 15, as indicated in FIGS. 5 and 7. Thus, as the teeth are pressed into the wood by applying substantial pressure to the plate, the tilting action of the teeth laterally compresses the wood fibers and their resiliency causes them to press against the teeth and aid in restraining the teeth from being pulled out of the wood as stresses are transmitted through the plate in use.

Moreover, as seen in FIGS. 4 and 7, the edge portion 15 of each tooth is originally substantially perpendicular to the plane of the plate so that the tooth is forced straight into the wood when pressure is applied to the plate, and as seen in FIGS. 5 and 7, when the corrugations have been substantially flattened and the teeth tilted, the edge portions 15 become undercuts on the teeth and increase their holding power in the wood. The fact that the teeth are forced straight into the wood and then tilted edgewise utilizes the resiliency of the wood fibers to increase holding power with a minimum amount of cutting through the fibers and consequently weakening the same.

The fact that the teeth of each pair have their edges 14 inclined in opposite directions also increases their holding power in the wood, because as the teeth are forced into the wood the individual teeth of each pair tend to rotate in opposite directions generating opposing forces compressing the wood fibers, and thereby additionally resisting a pulling force tending to pull the teeth from the wood. Also, the holding power of the plate as a whole is increased by turning alternate pairs of teeth 90° to the other pairs.

The arrangement and spacing of the teeth 13A, 13B, 13C and 13D enables close spacing of the teeth with maximum holding power with a minimum amount of weakening of the fibers, as the teeth are driven into the wood, and the edgewise tilting of the teeth as the corrugations are flattened utilizes the resilience of the wood fibers to further increase the holding power. The novel plate is inexpensive and gives maximum strength with minimum weight.

What is claimed is:

1. A connector plate for connecting abutting wood members and having parallel corrugations, a plurality of teeth each having at least one inclined edge punched out of said plate in pairs, the inclined edges of each pair of teeth being inclined in opposite directions, and said pairs of teeth being punched in rows out of each corrugation, with the individual teeth extending at least diagonally to the direction of said corrugations, and with the individual teeth of each pair formed from opposing slopes of the same corrugation, whereby flattening the corrugations will tilt the teeth laterally edgewise the depth of said corrugations before flattening being such that the tilting of the teeth due to flattening does not weaken the holding power of the teeth in the wood members.

2. A connector plate for connecting abutting wood members and having parallel corrugations, a plurality of substantially triangular teeth punched out of said corrugations in pairs and arranged in rows, the individual teeth of each pair extending at least diagonally to the direction of said corrugations and having edges inclined in opposite directions, and the individual teeth of each pair being formed from opposing slopes of the same corrugation, whereby flattening the corrugations will tilt the teeth laterally edgewise the depth of said corrugations before flattening being such that the tilting of the teeth due to flattening does not weaken the holding power of the teeth in the wood members.

3. A connector plate for connecting abutting wood members and having parallel corrugations, a plurality of pointed teeth punched out of said corrugations in pairs and arranged in parallel rows, the individual teeth of each pair extending diagonally to the direction of said corrugations, and the individual teeth of each pair being formed from opposing slopes of the same corrugation, whereby flattening the corrugations will tilt the teeth laterally edgewise the depth of said corrugations before flattening being such that the tilting of the teeth due to flattening does not weaken the holding power of the teeth in the wood members.

4. A connector plate for connecting abutting wood members and having parallel corrugations, a plurality of teeth each having at least one inclined edge punched out of said plate in pairs, the inclined edges of each pair of teeth being inclined in opposite directions, and said pairs of teeth being punched in rows out of each corrugation, with the individual teeth extending at least diagonally to the direction of said corrugations, and with the individual teeth of each pair formed from opposing slopes of the same corrugation in such manner that flattening of said corrugation will tilt said teeth laterally edgewise in a direction away from its inclined edge.

5. A connector plate for connecting abutting wood members and having parallel corrugations, a plurality of substantially triangular teeth punched out of said corrugations in pairs and arranged in rows, the individual teeth of each pair extending at least diagonally to the direction of said corrugations and having edges inclined in opposite directions, and the individual teeth of each pair being formed from opposing slopes of the same corrugation in such manner that flattening said corrugations will tilt the teeth laterally edgewise in directions away from their inclined edges.

6. A connector plate for connecting abutting wood members and having parallel corrugations, a plurality of pointed teeth punched out of said corrugations in pairs and arranged in parallel rows, each tooth having an edge portion substantially perpendicular to the plane of the plate, the individual teeth of each pair extending diagonally to the direction of said corrugations and being formed from opposing slopes of the same corrugation, whereby flattening of said corrugations will tilt the teeth laterally edgewise and dispose said perpendicular edge portions thereof as undercuts with respect to the plane of the plate.

7. A connector plate for connecting abutting wood members and having parallel corrugations, a plurality of pointed teeth punched out of said corrugations in pairs and arranged in rows, the individual teeth of each pair extending diagonally to the direction of said corrugations and being formed from opposing slopes of the same corrugation, the teeth of each pair having edges inclined in opposite directions and opposite edge portions substantially perpendicular to the plane of the plate, whereby flattening of said corrugations will tilt the teeth laterally edgewise in a direction away from their inclined edges and dispose their perpendicular edge portions as undercuts with respect to the plane of said plate.

8. A connector plate for connecting abutting wood members and having parallel corrugations, a plurality of substantially triangular transversely dished teeth punched out of said corrugations in pairs and arranged in rows, the individual teeth of each pair extending diagonally to the direction of said corrugations and being punched out from opposed sides of rows of substantially polygonal openings, and the individual teeth of each pair having edges inclined in opposite directions and formed from opposing slopes of the same corrugation, whereby flattening the corrugations will tilt the teeth laterally edgewise.

9. A connector plate for connecting abutting wood members and having parallel corrugations, a plurality of substantially triangular transversely dished teeth punched out of said corrugations in pairs and arranged in rows, the individual teeth of each pair extending diagonally to the direction of said corrugations and being punched out from opposed sides of rows of substantially octagonal openings, the individual teeth of each pair having edges inclined in opposite directions and opposite edge portions substantially perpendicular to the plane of the plate, whereby flattening of said corrugations will tilt the teeth laterally edgewise in a direction away from their inclined edges and dispose their perpendicular edge portions as undercuts with respect to the plane of the plate.

10. A connector plate for connecting abutting wood members, said plate having corrugations with ridges and valleys, said ridges and valleys being joined by sloping sides, a plurality of teeth punched out of said plate in pairs with each tooth having at least one inclined edge, an inclined edge of each tooth of a pair of teeth being inclined in an opposite sense to an inclined edge of the other tooth, each said tooth being attached to the plate along a sloping side thereof with said tooth extending between a ridge and valley at least diagonally to the direction at said ridge and valley, whereby flattening the corrugations will tilt the teeth laterally edgewise, the depth of said corrugations before flattening being such that the tilting of the teeth due to flattening does not weaken the holding power of the teeth in the wood members.

References Cited in the file of this patent

UNITED STATES PATENTS

| | | |
|---|---|---|
| 1,768,624 | McGuire | July 1, 1930 |
| 2,827,676 | Sanford | Mar. 25, 1958 |
| 2,844,852 | West | July 29, 1958 |

FOREIGN PATENTS

| | | |
|---|---|---|
| 332,152 | Germany | Sept. 9, 1917 |
| 575,954 | Canada | May 19, 1959 |

UNITED STATES PATENT OFFICE
CERTIFICATE OF CORRECTION

Patent No. 3,094,748                                     June 25, 1963

Arthur Carol Sanford

It is hereby certified that error appears in the above numbered patent requiring correction and that the said Letters Patent should read as corrected below.

Column 5, line 9, after "direction" insert -- of corrugation --.

Signed and sealed this 7th day of April 1964.

(SEAL)
Attest:
ERNEST W. SWIDER

Attesting Officer

EDWARD J. BRENNER

Commissioner of Patents